United States Patent

Raetzsch et al.

[11] Patent Number: 5,883,151
[45] Date of Patent: Mar. 16, 1999

[54] CONTINUOUS METHOD FOR PRODUCING POLYPROPYLENE MIXTURES OF INCREASED STRESS-CRACK RESISTANCE AND MELT STRENGTH

[75] Inventors: Manfred Raetzsch, Kirchschlag; Achim Hesse, Linz; Hartmut Bucka, Eggendorf; Norbert Reichelt, Neuhofen; Ulf Panzer, Perg, all of Austria; Reiner Mehnert, Markkleeberg, Germany

[73] Assignee: PCD Polymere Ges. m.b.H., Linz, Austria

[21] Appl. No.: 808,149

[22] Filed: Feb. 28, 1997

[30] Foreign Application Priority Data

Feb. 28, 1996 [DE] Germany .................. 196 07 480.0

[51] Int. Cl.⁶ ............................................. C08J 3/28
[52] U.S. Cl. ..................... 222/157; 522/158; 522/113; 522/114; 522/911; 522/912

[58] Field of Search ................... 522/157, 158, 522/113, 114, 911, 912

[56] References Cited

U.S. PATENT DOCUMENTS 3,349,018  10/1967  Potts ........................................ 522/157
4,916,198  4/1990  Scheve et al. ........................... 526/358

*Primary Examiner*—Duc Truong
*Attorney, Agent, or Firm*—Jordan and Hamburg LLP

[57] ABSTRACT

Polypropylene mixtures of increased stress-crack resistance and melt strength can be produced by irradiating polypropylene powders with low average particle diameters by low energy electron-beam accelerators with energies of 150 to 300 keV. The polypropylene mixtures produced are suitable particularly for producing films, sheets, panels, coatings, pipes, hollow objects and foamed materials.

9 Claims, No Drawings

CONTINUOUS METHOD FOR PRODUCING POLYPROPYLENE MIXTURES OF INCREASED STRESS-CRACK RESISTANCE AND MELT STRENGTH

The invention relates to a method for producing polypropylene mixtures of increased stress-crack resistance and melt strength by the action of ionizing radiation.

BACKGROUND OF THE INVENTION

It is well known that polypropylene can be cross linked, partially cross linked and modified by the action of gamma radiation or by the use of electron beam accelerators with energies of 0.5 MeV to 10 MeV. Additions of 2 to 3% of electron-irradiated polypropylene to unmodified polypropylene act as nucleating agents for polypropylene, increasing the crystallization temperature and shortening the crystallization time. This leads to an increased degree of crystallinity, a higher density and a higher modulus of elasticity (Menges, D., Kunststoffe 73 (1983) 5, 258–260; Lee, D., Kunststoffe 81 (1991) 7, 609–613, Kirch, D. Plastverarbeiter 37 (1986) 10, 100–106).

It is furthermore known that modified polypropylenes with free long-chain branching can be produced by treating polypropylene first with high-energy ionizing radiation by electron beam accelerators with energies of 500 to 4,000 keV and radiation doses of 1 to 9 Mrad under predominantly inert conditions and subsequently treating the modified polypropylenes with heat (German patent 3,688,258, European patent 0,190,889, German patent 0,634,441, German patent 0,351,866, U.S. Pat. No. 4,916,198, U.S. Pat. No. 5,047,446). The use of mixtures of these modified, branched polypropylenes with unmodified polypropylenes for producing films, sheets, panels and coatings is likewise known (European patent 0,634,454).

The high safety expenditure for biologically shielding the high radiation is a disadvantage when modifying polypropylene with high energy, ionizing radiation with electron beam accelerators of more than 500 keV. This shielding requires expensive hermitization of the radiation chamber by thick walls of concrete or by lead segment constructions, expensive radiation protection measurement techniques, as well as medical monitoring of the operating personnel. In the case of mixtures of modified and unmodified polypropylenes, a further disadvantage of the present technology consists therein that an additional processing step is required to produce the mixtures.

The aim of the invention was to develop a continuous method for producing polypropylene mixtures of higher stress-crack resistance and melt strength, without increased expenditure for safety and without an additional processing step for producing the mixture.

Surprisingly, it was observed that, when very finely divided polypropylene powders and low energy electron beam accelerators are used, mixtures of unmodified and modified polypropylene particles result, which meet the requirements for polypropylene mixtures of increased stress-crack resistance and melt strength, despite the very slight depth of penetration of the electrons having low energy.

OBJECTS AND SUMMARY OF THE INVENTION

The object of the invention therefore is a continuous method for producing polypropylene mixtures of increased stress-crack resistance and melt strength, for which polypropylene powders with an average particle diameter of 0.01 to 0.5 mm are subjected under inert conditions and with intensive mixing to low energy radiation by low energy electron beam accelerators with an energy of 150 to 300 keV at a radiation dose of 0.05 to 12 Mrd and preferably of 0.5 to 12 Mrd at 20° to 150° C. It is possible to also add 0.05% to 2.5% by weight of stabilizers, 0.1% to 1% by weight of antistatic agents, 0.1% to 3% by weight of pigments, optionally 0.05% to 5% by weight of bifunctional, unsaturated monomers, 0.05% to 1% by weight of nucleating agents, 5% to 40% by weight of fillers and reinforcing materials, 2% to 20% by weight of flame retardants and/or 0.01% to 1% by weight of processing aids to the polypropylene powders before and/or after the irradiation.

DETAILED DESCRIPTION OF THE INVENTION

The inventive continuous method uses low-energy electron beam accelerators with energies of 150 to 300 keV where the depth of penetration of the electron beam is only 0.4 mm. In order to achieve a modifying effect when irradiating polypropylene, it is necessary to use finely divided polypropylene powders with an average particle diameter of 0.01 to 0.5 mm and preferably of 0.05 to 0.2 mm.

The advantages of the low depth of penetration in relation to the safety requirements is that these low-energy accelerators require only little expenditure for biological shielding measures, since the electron beam is absorbed by the normal housing of the equipment. For this reason, special radiation protection measurement techniques and medical monitoring of the operating personnel are also not required. The preferred accelerator type for energies of 150 to 300 keV are low-energy electron beam accelerators of the band emitter type.

The polypropylene powders, used pursuant to the invention, preferably consist of polypropylene homopolymers, random propylene copolymers, propylene block copolymers, random propylene block copolymers and/or elastomeric polypropylenes.

The intensive mixing of the powdery mixtures during the application of the ionizing radiation preferably is achieved by the use of cassette reactors with vibration equipment, in which the material is transported by inert media.

The stabilizers, added before and/or after the irradiation of the polypropylene powder, preferably are mixtures of 0.01% to 0.6% by weight of phenolic antioxidants, 0.01% to 0.6% by weight of high-temperature stabilizers based on disulfides and polyethers, 0.01% to 0.6% by weight of processing stabilizers based on phosphites and/or 0.01% to 0.8% by weight of sterically hindered amines (HLAS).

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis-(6-t-butyl-4-methylphenol), 4,4'-thio-bis-(6-t-butyl-2-methylphenol), octadecyl 3-(3,5-di-t-butyl-4-hydroxyphenyl)propionate, 1,3,5-trimethyl-2,4,6-tris-(3',5'-di-t-butyl-4-hydroxybenzyl)benzene and/or pentaerythritol tetrakis(3-(3,5-di-t-butyl-4-hydroxyphenyl))propionate.

As HALS compounds bis-2,2,6,6-tetramethyl-4-piperidyl sebacate and/or poly-((1,-1,3,3,-tetramethylbutyl)-imino)-1, 3,5-triazine-2,4, diyl)(2,2,6,6,-tetramethylpiperidyl)- amino)-hexamethylene-4-(2,2,6,6-tetramethyl)piperidyl)-imino) are particularly suitable.

Furthermore, organic filler and reinforcing materials, such as talcum, chalk, mica, wollastonite, glass fibers, carbon fibers, aramide fibers or ceramic fibers, other synthetic fibers or cellulose fibers can be added before and/or after the irradiation.

Suitable processing aids are calcium stearate, magnesium stearate and/or waxes.

The addition of 0.05% to 2.5% by weight of stabilizers, 0.1% to 1% by weight of antistatic agents, 0.1% to 3% by weight of pigments, 0.05% to 1% by weight of nucleating agents, 5% to 40% by weight of fillers and/or reinforcing materials, 2% to 20% by weight of flame retardants and/or 0.01% to 1% by weight of processing aids to the polypropylene powders is carried out after the irradiation preferably in fluidized bed reactors at temperatures of 120° to 150° C. and residence times of 5 to 60 minutes or in extruders at temperatures of 170° to 280° C. at residence of 2 to 8 minutes.

As bifunctional, unsaturated monomers, which can be added before and/or during the irradiation, all bifunctional, unsaturated monomeric compounds can preferably be used, which can be absorbed as a gas phase and polymerized with the help of free radicals. The use of the following bifunctional, unsaturated monomers, in amounts preferably of 0.05% to 2% by weight of the polypropylene used, is preferred:

divinyl compounds, such as divinylaniline, N-divinylbenzene, p-divinylbenzene, divinylpentane and/or divinylpropane;

allyl compounds, such as allyl acrylate, allyl methacrylate, allyl methyl maleate and/or allyl vinyl ether;

dienes, such as butadiene, chloroprene, cyclohexadiene, cyclopentadiene, 2,3-dimethylbutadiene, heptadiene, hexadiene, isoprene and/or 1,4-pentadiene;

mixtures of these unsaturated monomers.

In a preferred variation of the inventive method, the 0.05% to 2% by weight of readily volatile, bifunctional monomers, which are added before the low energy irradiation, are absorbed from the gas phase by the polypropylene powder before and/or during the low energy irradiation of the polypropylene powder with 0.05 to 2 Mrd. The use of butadiene as a bifunctional monomer is particularly preferred.

The modifying effect is characterized by determining the stress-crack resistance and the melt strength.

The stress-crack resistance is determined by exposure of injection molded test objects in 5% levantine solution to a load of 9 N/mm$^2$.

The melt strength is determined by measuring the threshold value (strand diameter of the modified polypropylene powder mixture/strand diameter of the unmodified polypropylene powder by the melt index determination by the method of ISO 1131).

The polypropylene mixtures, produced pursuant to the invention, are suitable particularly for producing films, sheets, panels, coatings, pipes, hollow objects and foamed materials.

The invention is described by the following examples:

EXAMPLE 1

The kneader is drummed up on a powdery polypropylene homopolymer (having a melt index of 0.9 g/10 min at 230° C./21.19N and an average particle diameter of 0.2 mm), 0.15% by weight of 2,6-dicyclopentyl-4-methylphenol and 0.15% by weight of bis-2,2,6,6-tetramethyl-4-piperidyl sebacate and the mixture is conveyed by an inert gas pneumatically into a 0.20×3.50 m cassette reactor with four integrated cathodes of a low energy accelerator of the band emitter type (with an energy of 250 keV and a radiation output of 4×10 kW) and integrated vibration equipment. The throughput is 3.1 kg/min at a radiation temperature of 85° C. The irradiated, powdery mixture is granulated at 235° C. in a Werner & Pfleiderer twin screw ZSK 82 extruder under inert conditions. The modified polypropylene mixture has a stress-crack resistance of 205 hours and a threshold value of 1.45.

EXAMPLE 2

A random polypropylene copolymer (with an ethylene content of 6% by weight, a melt index of 2.2 g/10 min at 230° C./21.19N and an average particle diameter of 0.31 mm) is conveyed pneumatically by a carrier gas stream of pure nitrogen into the cassette reactor with the irradiating facilities of Example 1. The throughput of the fluidized loose material layer at a radiation temperature of 105° C. is 1.8 kg/min. The irradiated, powdery mixture is transferred into a fluidized bed reactor and, after the addition of 0.2% by weight of 4,4'-thio-bis-(6-t-butyl-2-methylphenol) and 0.15% by weight of poly-((1,1,3,3,-tetramethylbutyl)-imino)-1,3,5-triazine-2,4-diyl)(2,2,6,6-tetramethylpiperidyl)-amino)-hexamethylene-4-(2,2,6,6-tetramethyl)-piperidyl)-imino), is homogenized at 130° C. and a residence time of 40 minutes. The modified mixture has a stress-crack resistance of 225 hours and a threshold value of 1.3.

EXAMPLE 3

A 1:1 mixture of powdery polypropylene homopolymer (with a melt index of 0.9 g/10 min at 230° C./21.19N and an average particle diameter of 0.2 mm) and a random polypropylene copolymer (with an ethylene content of 6% by weight, a melt index of 2.2 g/10 min at 230° C./21.19N and an average particle diameter of 0.31 mm) is conveyed pneumatically by a carrier gas stream of pure nitrogen into the cassette reactor with irradiating facilities of Example 1. The throughput of the fluidized loose material layer at a radiation temperature of 95° C. is 0.8 kg/min. After the addition of 0.15% by weight of 2,6-di-t-butyl-4-methoxymethylphenol, 0.15% by weight of bis-2,2,6,6-tetramethyl-4-piperidyl sebacate, 0.3% by weight of carbon black and 0.3% by weight of behenic acid, the mixture is homogenized at 225° C. (with a residence time of 5.1 min) in a Werner & Pfleiderer twin screw ZSK 82 extruder under inert conditions. The modified mixture has a stress-crack resistance of 265 hours and a threshold value of 1.60.

EXAMPLE 4

A random polypropylene copolymer (with an ethylene content of 6% by weight, a melt index of 2.2 g/10 min at 230° C./21.19N and an average particle diameter of 0.31 mm) is conveyed pneumatically by a carrier gas stream of 95% by volume of pure nitrogen and 5% by volume of butadiene into the cassette reactor with irradiating facilities of Example 1. The throughput of the fluidized loose material layer at a radiation temperature of 100° C. is 6.8 kg/min. The irradiated, powdery mixture is transferred into a fluidized bed reactor and, after the addition of 0.2% by weight of 4,4'-thio-bis-(6-t-butyl-2-methyl-phenol) and 0.15% by weight of poly-((1,1,3,3,-tetramethylbutyl)-imino)-1,3,5-triazine-2,4-diyl)(2,2,6,6-tetramethylpiperidyl)-amino)-hexamethylene-4-(2,2,6,6-tetra-methyl)-piperidyl)-imino), is homogenized at 125° C. and a residence time of 35 minutes. The modified mixture has a stress-crack resistance of 235 hours and a threshold value of 1.50.

We claim:

1. A continuous method for producing polypropylene mixtures of increased stress-crack resistance and melt strength comprising irradiating polypropylene powders with an average particle diameter of 0.01 to 0.5 mm under inert conditions using low-energy radiation from a low energy electron accelerator of 150 to 300 keV at a radiation dose of 0.05 to 12 Mrd and mixing the polypropylene powders for obtaining polypropylene mixtures of unmodified and modified polypropylene particles having increased stress-crack resistance and melt strength.

2. The continuous method for producing polypropylene mixtures of increased stress-crack resistance and melt strength of claim 1, further comprising adding 2% by weight of volatile, bifunctional monomers.

3. A method of forming films, sheets, fibers, panels, coatings, pipes, hollow bodies and foams comprising melt processing the polypropylene mixtures of claim 1 to produce a form selected from the group consisting of films, sheets, fibers, panels, coatings, pipes, hollow bodies and foams.

4. The continuous method for producing polypropylene mixtures of increased stress-crack resistance and melt strength of claim 1, wherein the radiation dose is 0.5 to 12 Mrd and the polypropylene powders are irradiated between 20° and 150° C.

5. The continuous method for producing polypropylene mixtures of increased stress-crack resistance and melt strength of claim 1, further comprising adding to the polypropylene powder 0.05 to 2.5% by weight of stabilizers, 0.1 to 1% by weight of antistatic agents, 0.1 to 3% by weight of pigments, 0.05 to 5% by weight of bifunctional, unsaturated monomers, 0.05 to 1% by weight of nucleating agents, 5 to 40% by weight of fillers, 5 to 40% by weight of reinforcing agents, 2 to 20% by weight of flame retardants, and 0.01 to 1% by weight of processing aids.

6. The continuous method for producing polypropylene mixtures of increased stress-crack resistance and melt strength of claim 5, wherein the step of adding precedes the step of irradiating the powders.

7. The continuous method for producing polypropylene mixtures of increased stress-crack resistance and melt strength of claim 5, wherein the step of adding follows the step of irradiating the powders.

8. The continuous method for producing polypropylene mixtures of increased stress-crack resistance and melt strength of claim 5, wherein the step of adding precedes and follows the step of irradiating the powders.

9. The continuous method for producing polypropylene mixtures of increased stress-crack resistance and melt strength of claim 2, wherein the volatile, bifunctional monomers are butadiene monomers.

* * * * *